(12) United States Patent
Choi et al.

(10) Patent No.: US 9,544,124 B2
(45) Date of Patent: Jan. 10, 2017

(54) METHOD AND APPARATUS FOR PERFORMING RANGING AT M2M DEVICE IN A WIRELESS COMMUNICATION SYSTEM

(75) Inventors: Jinsoo Choi, Anyang-si (KR); Hangyu Cho, Anyang-si (KR); Jinsam Kwak, Anyang-si (KR); Kiseon Ryu, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 431 days.

(21) Appl. No.: 14/009,489

(22) PCT Filed: Mar. 29, 2012

(86) PCT No.: PCT/KR2012/002321
§ 371 (c)(1),
(2), (4) Date: Oct. 2, 2013

(87) PCT Pub. No.: WO2012/141441
PCT Pub. Date: Oct. 18, 2012

(65) Prior Publication Data
US 2014/0029539 A1   Jan. 30, 2014

Related U.S. Application Data

(60) Provisional application No. 61/474,729, filed on Apr. 12, 2011, provisional application No. 61/504,709, filed on Jul. 6, 2011.

(51) Int. Cl.
*H04W 4/00* (2009.01)
*H04L 5/00* (2006.01)
(Continued)

(52) U.S. Cl.
CPC ......... *H04L 5/0096* (2013.01); *H04L 27/2602* (2013.01); *H04W 48/12* (2013.01)

(58) Field of Classification Search
USPC .......................................... 370/329
See application file for complete search history.

(56) References Cited

U.S. PATENT DOCUMENTS

2010/0279676 A1   11/2010   Benn et al.
2011/0090884 A1*   4/2011   Won .................. H04W 28/18
                                                370/338
(Continued)

FOREIGN PATENT DOCUMENTS

| CN | 102047585 | 5/2011 |
| WO | 2010/093168 | 8/2010 |
| WO | 2011/018419 | 2/2011 |

OTHER PUBLICATIONS

Chiu at al. (U.S. Appl. No. 61/381,786, filed Sep. 10, 2010).*
(Continued)

*Primary Examiner* — Edan Orgad
*Assistant Examiner* — Sithu Ko
(74) *Attorney, Agent, or Firm* — Lee Hong Degerman Kang Waimey

(57) ABSTRACT

A method and apparatus for performing ranging at a Machine to Machine (M2M) device in a wireless communication system are disclosed. The method includes receiving a Primary SuperFrame Header (P-SFH) and a Secondary SuperFrame Header (S-SFH), receiving an Advanced Air Interface-System Configuration Descriptor (AAI-SCD) message, and performing dedicated ranging using M2M dedicated ranging information included in the AAI-SCD message, wherein first count information included in the S-SFH is increased whenever the M2M dedicated ranging information are changed, wherein information indicating a change in the S-SFH, included in the P-SFH are not changed by update of the first count information.

14 Claims, 8 Drawing Sheets

(51) Int. Cl.
*H04L 27/26* (2006.01)
*H04W 48/12* (2009.01)

(56) References Cited

U.S. PATENT DOCUMENTS

| | | | | |
|---|---|---|---|---|
| 2011/0103307 A1* | 5/2011 | Kim | ....................... | H04L 5/0048 370/328 |
| 2012/0063305 A1* | 3/2012 | Chiu | ................. | H04W 74/0833 370/230 |
| 2013/0182685 A1* | 7/2013 | Yu | ....................... | H04W 72/087 370/336 |

OTHER PUBLICATIONS

Choi, et al., "Consideration on the Update Procedure of the System Information for M2M," IEEE 802.16 Presentation Submission Template (Rev. 9), Doc Number: IEEE C80216p-10/0023, XP017712445, Dec. 2010, 10 pages.

Choi, et al., "Proposed text of Clarification for Update of the AAI_SCD Message (16.2.3.30)," IEEE C802.16m-10/0994r4, IEEE 802.16 Broadband Wireless Access Working Group, XP017723722, Aug. 2010, 6 pages.

Draft Amendment to IEEE Standard for Local and metropolitan area networks, "Part 16: Air Interface for Broadband Wireless Access Systems," IEEE P802.16m/D12, XP017716364, Feb. 2011, 1086 pages.

European Patent Office Application Serial No. 12771494.7, Search Report dated Aug. 13, 2014, 4 pages.

The State Intellectual Property Office of the People's Republic of China Application Serial No. 201280018380.0, Office Action dated Jul. 27, 2015, 5 pages.

Chen, et al., "Cellular Based Machine to Machine Communication with Un-peer2peer Protocol Stack," 2009 IEEE 70th Vehicular Technology Conference Fall (VTC 2009-Fall), Sep. 2009, pp. 1-5.

PCT International Application No. PCT/KR2012/002321, Notification of Transmittal of the International Search Report and The Written Opinion of the International Searching Authority, or Declaration dated Oct. 31, 2012, 8 pages.

Park, et al., "Proposed text for network reentry procedure of fixed M2M device," IEEE 802.16 Broadband Wireless Access Working Group, IEEE C802.16p-11/0018r1, Mar. 2011, 6 pages.

Huang, et al., "Network reentry from idle mode for M2M devices without mobility," IEEE 802.16 Broadband Wireless Access Working Group, IEEE C80216p-11/0040r4, Mar. 2011, 4 pages.

* cited by examiner

METHOD AND APPARATUS FOR PERFORMING RANGING AT M2M DEVICE IN A WIRELESS COMMUNICATION SYSTEM

CROSS-REFERENCE TO RELATED APPLICATIONS

This application is the National Stage filing under 35 U.S.C. 371 of International Application No. PCT/KR2012/002321, filed on Mar. 29, 2012, which claims the benefit of U.S. Provisional Application Serial Nos. 61/474,729, filed on Apr. 12, 2011, and 61/504,709, filed on Jul. 6, 2011, the contents of which are all hereby incorporated by reference herein in their entirety.

TECHNICAL FIELD

The present invention relates to wireless communications, and more particularly, to a method for performing network reentry at a Machine to Machine (M2M) device and the M2M device in a wireless communication system.

BACKGROUND ART

Legacy communication is mostly Human to Human (H2H) communications conducted via a Base Station (BS). Now, the development of communication technology enables M2M communication. As its appellation implies, M2M communication is communications between electronic terminals. While M2M communications means wired or wireless communication between electronic terminals or communication between a human-controlled terminal and a machine in its broadest sense, it is typical in these days that M2M communication refers to wireless communication between electronic terminals, i.e. terminals.

When the concept of M2M communication was introduced in the early 1990s, it was regarded merely as the concept of remote control or telematics and its market was very limited. However, M2M communication has been drastically developed and the M2M communication market has attracted much attention all over the world including Korea over the past few years. Especially, M2M communication has a great influence on the fields of fleet management, remote monitoring of machines and facilities, smart metering for automatically measuring the working time of construction equipment and the consumption of heat or electricity, etc. in the market of Point Of Sales (POS) and security-related applications. It is expected that M2M communication will find its various uses in conjunction with legacy mobile communication, very high-speed wireless Internet or Wireless Fidelity (WiFi), and low-output communication solutions such as Zigbee and thus will extend to Business to Customer (B2C) markets beyond Business to Business (B2B) markets.

In the era of M2M communication, every machine equipped with a Subscriber Identity Module (SIM) card can be managed and controlled remotely because it is possible to transmit data to and receive data from the machine. For example, M2M communication is applicable to a very broad range including numerous terminals and equipment such as a car, a truck, a train, a container, an automatic vending machine, a gas tank, etc.

As the application types of M2M devices have been increasing in number, a number of such M2M devices may exist in the same BS. When a huge number of M2M devices in idle state attempt network reentry, connection collisions and congestions increase, thus degrading communication performance. However, there is no specified procedure for performing network reentry in idle state by an M2M device having different characteristics from an existing terminal (H2H terminal).

DISCLOSURE OF INVENTION

Technical Problem

An object of the present invention devised to solve the problem lies on a method and apparatus for performing a network reentry procedure, which can efficiently support an M2M device, while minimizing an influence on a network reentry procedure of an existing terminal, that is, a Human to Human (H2H) terminal in a wireless communication system.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The object of the present invention can be achieved by providing a method for performing ranging at a Machine to Machine (M2M) device in a wireless communication system, including receiving a Primary SuperFrame Header (P-SFH) and a Secondary SuperFrame Header (S-SFH), receiving an Advanced Air Interface-System Configuration Descriptor (AAI-SCD) message, and performing dedicated ranging using M2M dedicated ranging information included in the AAI-SCD message, wherein first count information included in the S-SFH is increased whenever the M2M dedicated ranging information are changed, wherein information indicating a change in the S-SFH, included in the P-SFH are not changed by update of the first count information.

In another aspect of the present invention, provided herein is a method for transmitting ranging information at a Base Station (BS) in a wireless communication system, including transmitting a P-SFH and an S-SFH, and transmitting an AAI-SCD message, wherein first count information included in the S-SFH is increased whenever the M2M dedicated ranging information are changed, wherein information indicating a change in the S-SFH, included in the P-SFH are not changed by update of the first count information.

In another aspect of the present invention, provided herein is an M2M device for performing ranging in a wireless communication system, including a Radio Frequency (RF) unit and a processor. The processor receives a P-SFH, an S-SFH, and an AAI-SCD message through the RF unit and controls dedicated ranging to be performed using M2M dedicated ranging information included in the AAI-SCD message, wherein first count information included in the S-SFH is increased whenever the M2M dedicated ranging information are changed, wherein information indicating a change in the S-SFH, included in the P-SFH are not changed by update of the first count information.

In a further aspect of the present invention, provided herein is a BS for transmitting ranging information in a wireless communication system, including an RF unit and a processor. The processor transmits a P-SFH, an S-SFH, and an AAI-SCD message through the RF unit, wherein first count information included in the S-SFH is increased whenever the M2M dedicated ranging information are changed, wherein information indicating a change in the S-SFH, included in the P-SFH are not changed by update of the first count information.

According to the above aspects, the AAI-SCD message may include second count information that increases whenever the M2M dedicated ranging information is changed, and the first count information may indicate the second count information.

The S-SFH including the first count information may be an S-SFH SubPacket 3 Information Element (S-SFH SP3 IE).

The M2M device may always decode the S-SFH SP3 IE even though the P-SFH does not indicate the S-SFH SP3 IE.

The information indicating a change in the S-SFH, included in the P-SFH may be an S-SFH change count and an S-SFH SP change bitmap.

The M2M dedicated ranging information may include information about M2M dedicated ranging resources.

A configuration change count included in the AAI-SCD message may not be increased even though the dedicated ranging information is changed.

Advantageous Effects of Invention

According to the embodiments of the present invention, an M2M device can perform network reentry fast and efficiently, while minimizing an influence on an existing terminal (H2H terminal) in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
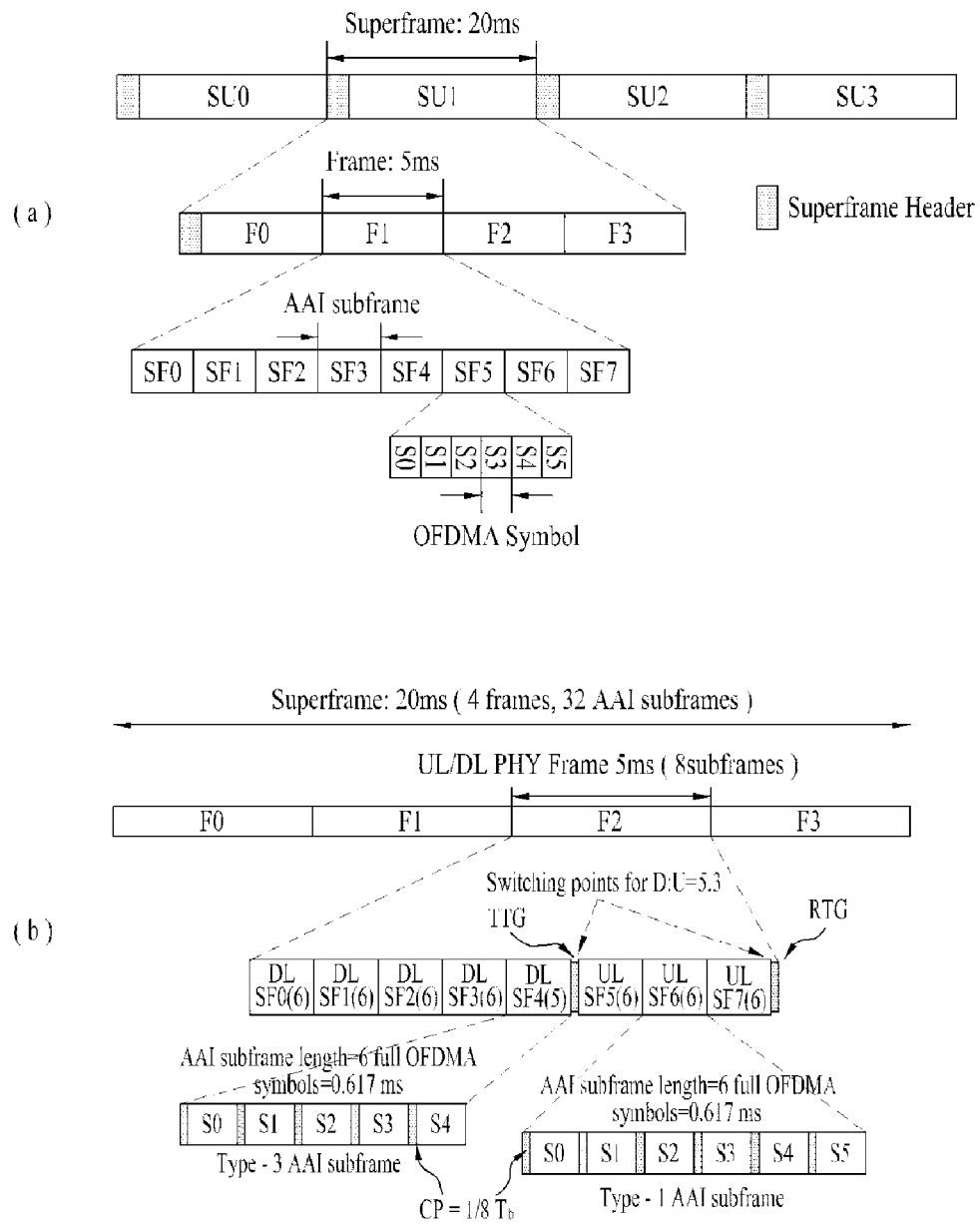
FIG. 1 illustrates the structure of a superframe in an Institute of Electrical and Electronics Engineers (IEEE) 802.16m system as an exemplary wireless communication system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a system conforming to Institute of Electrical and Electronics Engineers (IEEE) 802.16 is being used. However, the description is applicable to any other wireless communication system (e.g. Long Term Evolution (LTE)/LTE-Advanced (LTE-A) except for specific features inherent to the IEEE 802.16 standards.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), or an Advanced Mobile Station (AMS). In addition, the term Base Station (BS) generically refers to any node at a network end which communicates with a UE, such as a Node B, an evolved Node B (eNode B), an Access Point (AP), an Advanced BS (ABS), etc. The following description is given on the assumption that a UE is a AMS conforming to the IEEE 802.16m standard and a BS is also an ABS conforming to the IEEE 802.16m standard.

In a wireless communication system, a UE can receive information from a BS on a downlink and transmit data to the BS on an uplink. Information transmitted from or received at the UE includes data and various types of control information. There are many physical channels depending on the types and usages of information transmitted from or received at UEs.

A terminal that conducts Machine to Machine (M2M) communication may be referred to as various names such as an M2M device, an M2M communication terminal, and a Machine Type Communication (MTC) terminal. Existing terminals may be referred to as Human Type Communication (HTC) terminals or Human to Human (HTH) terminals.

As the number of machine application types increases, M2M devices will also be gradually increased in number. Machine application types under consideration are (1) security; (2) public safety; (3) tracking and tracing; (4) payment; (5) healthcare; (6) remote maintenance and control; (7) metering; (8) consumer devices; (9) fleet management in Point Of Sales (POS)-related and security-related application markets; (10) communication between terminals at a vending machine; (11) remote control of machines and facilities and smart metering for automatically measuring the operation time of construction machines and facilities and heat or power consumption; and (12) surveillance video communication, which should not be construed as limiting the present invention. Besides, many other machine application types are being discussed. As machine application types get diversified in this manner, the number of M2M devices is increasing, compared to the number of existing terminals, that is, H2H terminals.

The existence of numerous M2M devices within the service area of the same BS may cause connection congestions between the M2M devices and the existing terminals, i.e. H2H terminals and connection collisions between the M2M devices. Accordingly, there exists a need for discussing how efficiently to distribute limited resources to a newly emerged huge number of M2M devices, while minimizing their effects on the existing terminals (H2H terminals).

That is, if a network reentry procedure for idle-mode existing terminals (i.e. H2H terminals) is still applied to a plurality of M2M devices, connection congestions may occur between existing H2H terminals and M2M devices in view of the nature of the M2M devices. Therefore, the network reentry procedure needs to be partially modified.

FIG. 1 illustrates the structure of a superframe in an IEEE 802.16m system as an exemplary wireless communication system.

Referring to FIG. 1, a superframe is 20 ms long, including four frames. Each frame is further divided into eight subframes. In Time Division Duplexing (TDD), eight subframes may be divided into a Downlink (DL) subframe area and an Uplink (UL) subframe area and the DL and UL subframe areas include predetermined numbers of subframes according to a DL/UL ratio. Referring to FIG. 1(b), if the UL/DL ratio is 5:3, five out of eight subframes are allocated as DL subframes SF0 to SF4 and the remaining three subframes are allocated as UL subframes SF5, SF6 and SF7.

An idle time to which no data symbol carrying data (i.e. no effective symbol) is allocated, called Transmit/receive Transition Gap (TTG) is interposed between the DL subframe area and the UL subframe area. An idle time called Receive/transmit Transition Gap (RTG) may also exist after the DL subframe area. One subframe includes six Orthogonal Frequency Division Multiplexing (OFDM) symbols.

A BS and a UE may exchange data with each other using the above-described frame structure. For example, the UE may receive data from the BS in DL subframes and may transmit data to the BS in UL subframes. The BS may transmit data to the UE in the DL subframes and may receive data from the UE in the UL subframes.

In the above-described frame structure, a SuperFrame Header (SFH) may be transmitted to the UE in a superframe. The SFH may deliver system information or resource allocation information about each frame or subframe included in the superframe. The SFH may reside in the first subframe of the superframe, occupying five OFDM symbols.

The SFH may be divided into a Primary Superframe Header (P-SFH) and a Secondary Superframe Header (S-SFH).

The P-SFH may be transmitted in every superframe, carrying system information for the superframe. The P-SFH may contain an S-SFH change count field, S-SFH scheduling information field, an S-SFH change bitmap field, and an S-SFH application hold indicator field.

The S-SFH change count field may indicate whether the value of each field in S-SFH SP IEs has been changed (updated). That is, if the value of any field in the S-SFH SP IEs has been changed, the S-SFH change count field is incremented by 1 modulo 16, beginning with the next S-SFH change cycle. The changed S-SFH change count field is maintained until the second next S-SFH change cycle. If the value of an S-SFH change count field in the next P-SFH IE is equal to a value stored in the UE, the UE neglects the S-SFH IEs, determining that the S-SFH IEs remain unchanged.

The S-SFH change bitmap field may indicate a changed S-SFH SubPacket (SP) IE. The bits of the S-SFH change bitmap field represent an S-SFH SP1 IE, an S-SFH SP2 IE, and an S-SFH SP3 IE, respectively. When an S-SFH SP IE is changed, the bit corresponding to the S-SFH SP IE may be set to 1 and otherwise, the bit may be set to 0. For example, if the S-SFH SP3 IE is changed, the S-SFH SP change bitmap field may be expressed as 100.

The S-SFH application hold indicator field may explicitly indicate a time at which a changed SFH SP IE is to be applied. If the S-SFH application hold indicator field is 0, the UE uses an S-SFH SP IE associated with the current S-SFH change count field. If the S-SFH application hold indicator field is 1, the UE uses an S-SFH SP IE associated with a previous S-SFH change count field.

The S-SFH may carry network entry/reentry information and may be divided into three SPs each having a different periodicity. Information about these periodicities may be included as SP scheduling periodicity information in the S-SFH SP3 IE. The S-SFH SP1 IE includes network reentry information, the S-SFH SP2 IE includes information for initial network entry and network discovery, and the S-SFH SP3 IE includes the other required system information for network entry/reentry.

Figure 2:
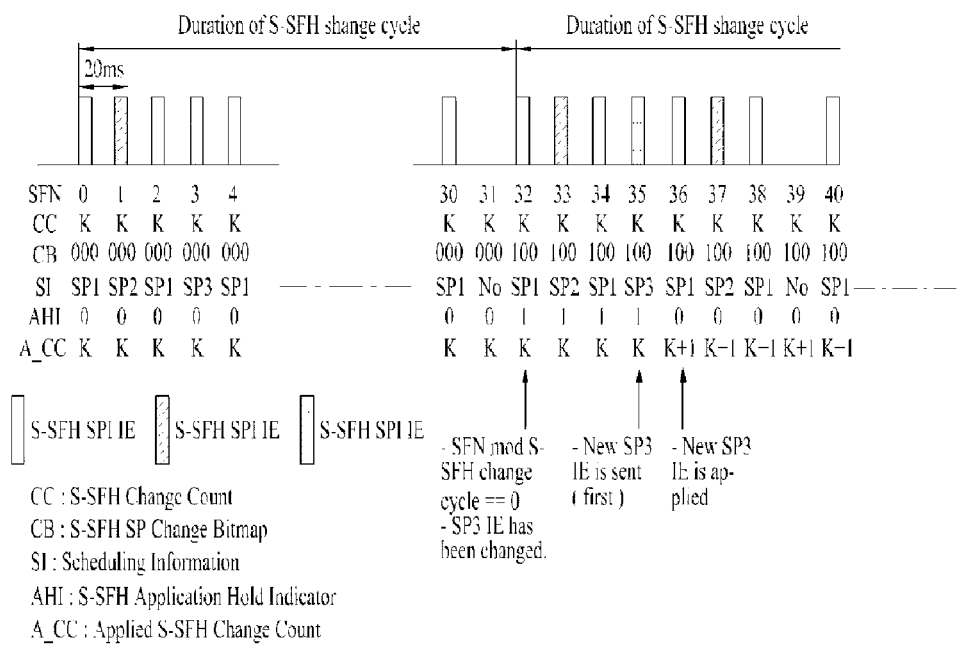
FIG. 2 illustrates update of Secondary SuperFrame Header (SFH) Information Elements (IEs) in the IEEE 802.16m system.

FIG. 2 is a view referred to for describing update of the S-SFH IEs in the IEEE 802.16m system, especially when information included in the S-SFH SP3 IE is changed.

Referring to FIG. 2, an S-SFH change cycle of 32 is given and a specific S-SFH SP IE is transmitted every SuperFrame Number (SFN). For example, if a BS changes network reentry information in the S-SFH SP3 IE of SFN 10, a CC representing an S-SFH change count field is incremented by 1, beginning with the start of the next S-SFH change cycle, SFN 32. Additionally, a CB representing an S-SFH change bitmap field is changed from 000 to 100 in order to indicate that the changed S-SFH IE is the S-SFH SP3 IE.

Upon receipt of a P-SFH IE, a UE checks the S-SFH change count field and recognizes that the CC is larger than K stored in the UE by 1 in SFN 32, which means that an S-SFH SP IE has been changed. Then the UE identifies from the CB that the S-SFH SP3 IE has been changed and awaits reception of the S-SFH SP3 IE. The UE receives the first changed S-SFH SP3 IE in SFN 35 and decodes it so as to use changed network reentry information, beginning with SFN 36. If the changed S-SFH IE is the S-SFH SP1 IE or S-SFH SP2 IE, the changed contents are applied beginning with the second transmitted changed S-SFH IE.

In this manner, the UE may determine which S-SFH SP IE to decode in the current superframe to update system parameters broadcast within the S-SFH SP IEs based on the S-SFH change count field, the S-SFH SP change bitmap field, and the S-SFH application hold indicator field.

Meanwhile, an Advanced Air Interface-System Configuration Descriptor (AAI-SCD) message is used for a BS to transmit system configuration information periodically. When the contents of the AAI-SCD message are changed, the value of a Configuration Change Count field is incremented by 1 modulo 16.

The BS indicates when a changed AAI-SCD message will be applied through an SCD count field of the S-SFH SP3 IE. After transmitting an S-SFH SP3 IE including an SCD count field equal to the configuration change count of the AAI-SCD message, the BS applies the changed system configuration.

Meanwhile, the UE receives system configuration information in an AAI-SCD message associated with the current SCD count field. If the AAI-SCD change is caused by update of the S-SFH SP 3 IE, the new AAI-SCD message is transmitted before the changed S-SFH SP3. After receiving the changed S-SFH SP3, the UE may use a system configuration indicated by the AAI-SCD message associated with the current SCD count field.

Figure 3:
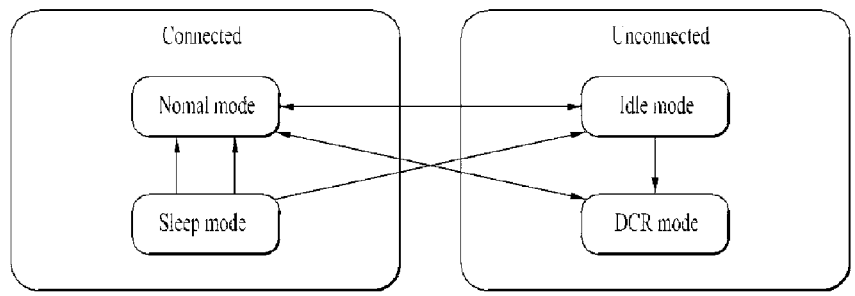
FIG. 3 is a diagram illustrating states of a User Equipment (UE) in the IEEE 802.16m system.

FIG. 3 is a diagram illustrating states of a UE in the IEEE 802.16m system.

Referring to FIG. 3, UE states may be divided largely into a connected state and an unconnected state. The connected state may further be divided into normal mode and sleep mode. The unconnected state may further be divided into idle mode and Deregistration with Context Retention (DCR) mode. Both the sleep mode and the idle mode are defined to efficiently use the power consumption of UEs.

In the sleep mode, a sleep mode pattern is used for power saving. The sleep mode pattern is composed of a sleep window and a listening window, approved by a BS through exchange AAI Sleep Request and AAI Sleep Response (AAI-SLP-REQ/AAI-SLP-RSP) messages between the BS and a UE. The idle mode uses a paging group, a paging cycle, and a paging offset that are approved by the BS through exchange of AAI Deregistration Request (AAI-DREG-REQ) and AAI Deregistration Command (AAI-DREG-CMD) messages between the BS and the UE.

The normal mode is a mode in which a UE implements a system-provided service using radio resources. In the DCR mode, the UE is deregistered from a network but its context is preserved for a predetermined time.

A basic sleep-mode operation will be described below. When UL or DL traffic has not been generated in the normal mode for a predetermined time, the UE transmits an AAI-SLP-REQ message to the BS to request transition to the sleep mode. Upon receipt of the sleep-mode operation request in the AAI-SLP-REQ message, the BS finally accepts the request of the AAI-SLP-RSP message and the UE operates in the sleep mode, after it is allocated an Identifier (ID) (SLPID) identifying a sleep-mode UE through an AAI-SLP-RSP message.

Important parameters acquired through message transmission and reception between the UE and the BS are an initial sleep window indicating an initial sleep window size, a final sleep window base indicating a last sleep window size, a final sleep-window exponent, a listening window indicating a listening window size. These parameters are all represented in frames. The sleep window refers to a period in which a sleep-mode UE minimizes its power. Thus the UE does not receive DL control information and DL traffic during the sleep window. The listening window is a period in which the sleep-mode UE transitions from the sleep window, receives an AAI Traffic Indication (AAI-TRF-IND) message from the BS, and determines the presence or absence of DL traffic directed to it. The UE may receive DL control information and DL traffic during the listening window.

Now a description will be given of a basic idle-mode operation. When no UL or DL traffic has been generated in the normal mode, the UE transmits an AAI-DREG-REQ message to the BS to request transition to the idle mode. Then the UE receives an AAI-DREG-CMD message from the BS and operates in the idle mode. The AAI-DREG-REQ message defines a UE-requested paging cycle. Upon receipt of the AAI-DREG-REQ message, the BS defines a paging group ID, a paging offset, and a paging cycle in the AAI-DREG-CMD message. The UE sets a paging unavailable interval and a paging listening interval based on the parameters.

The UE minimizes its power during the paging unavailable interval and receives an AAI Paging Advertisement (AAI-PAG-ADV) message from the BS during the paging listening interval. The AAI-PAG-ADV message includes the paging group ID of a paging group to which the BS belongs, Medium Access Control (MAC) address hash information indicating UEs requiring location update or network entry/reentry among idle-mode UEs, and an action code that describes a procedure that each UE should perform.

Upon generation of traffic directed to an idle-mode UE, the BS transmits an AAI-PAG-ADV message to the UE during the next paging listening interval. Upon receipt of the AAI-PAG-ADV message, the UE transitions from the idle mode to the normal mode.

A process of adjusting transmission parameters (a frequency offset, a time offset, and transmission power) for UL communication with the BS by the UE during network entry or network reentry in the idle mode is called ranging.

There are four ranging modes: initial ranging, handover ranging, periodic ranging, and bandwidth request ranging.

Initial ranging is a process of adjusting transmission parameters (a frequency offset, a time offset, and transmission power) for UL communication with a BS by a UE during initial network entry. Handover ranging is a simplified ranging process for handover of a UE. Periodic ranging is a process of maintaining UL communication with a BS by a UE after network entry. Bandwidth request ranging is performed for a UE to request a UL bandwidth to a BS, upon generation of UL traffic.

In the wireless communication system, the network allocates a ranging code (or a ranging preamble) and a ranging code transmission area (i.e. a Ranging Channel (RCH)) for ranging on a channel that broadcasts system information (e.g., a Broadcast Assignment A-MAP IE) according to the type of ranging. For example, to perform handover ranging, a UE selects a specific ranging code from among available ranging codes and requests ranging by transmitting the selected ranging code to the network on a handover RCH. The network may identify the ranging type from the ranging code and the channel carrying the ranging code.

In the IEEE 802.16m system, RCHs are classified into a Synchronized Ranging Channel (S-RCH) for ranging of a synchronized UE and a Non-Synchronized Ranging Channel (NS-RCH) of ranging of a non-synchronized UE. A Bandwidth Request Channel (BRCH) is also defined for a UE to request a UL bandwidth upon generation of data to be transmitted. These RCHs (the S-RCH and the NS-RCH) and the BRCH are used as a ranging opportunity and a bandwidth request opportunity, respectively at the MAC layer.

A transmission scheme of ranging code and RCH allocation information and an allocated RCH are determined according to a BS type.

For example, in case of a BS supporting a WirelessMAN-OFDMA with FDM-based UL PUSC Zone and a BS having narrow coverage such as a femtocell, asynchronization between a UE and a BS is less likely. Therefore, an S-RCH is used for any of initial ranging, handover ranging, and periodic ranging.

Ranging code and RCH allocation information is basically transmitted in an SFH (SP1: a Ranging Parameter (RP), code partition information for the S-RCH, an allocation periodicity of the S-RCH, and a subframe offset of the S-RCH).

In case of the other BSs (e.g. a macro BS, a relay, and a macro hot-zone), an NS-RCH is used during initial ranging or handover ranging. When a UE is already synchronized, the UE uses an S-RCH during periodic ranging.

Ranging code and RCH allocation information is basically transmitted in an SFH (SP1: an RP, code partition information for the NS-RCH, an allocation periodicity of the NS-RCH, and a subframe offset of the NS-RCH). Besides the SFH, RCH allocation information may be transmitted in an A-MAP or AAI-SCD message. In case of an A-MAP, NS-RCH allocation information for handover ranging may be transmitted in a Broadcast Assignment A-MAP IE or an AAI-HO-CMD message in a subframe other than a subframe used for allocation of broadcast data according to a scheduling determination of a BS. If an AAI-SCD message is used, it includes information about an S-RCH allocation period and the number of ranging codes for periodic ranging.

Figure 4:
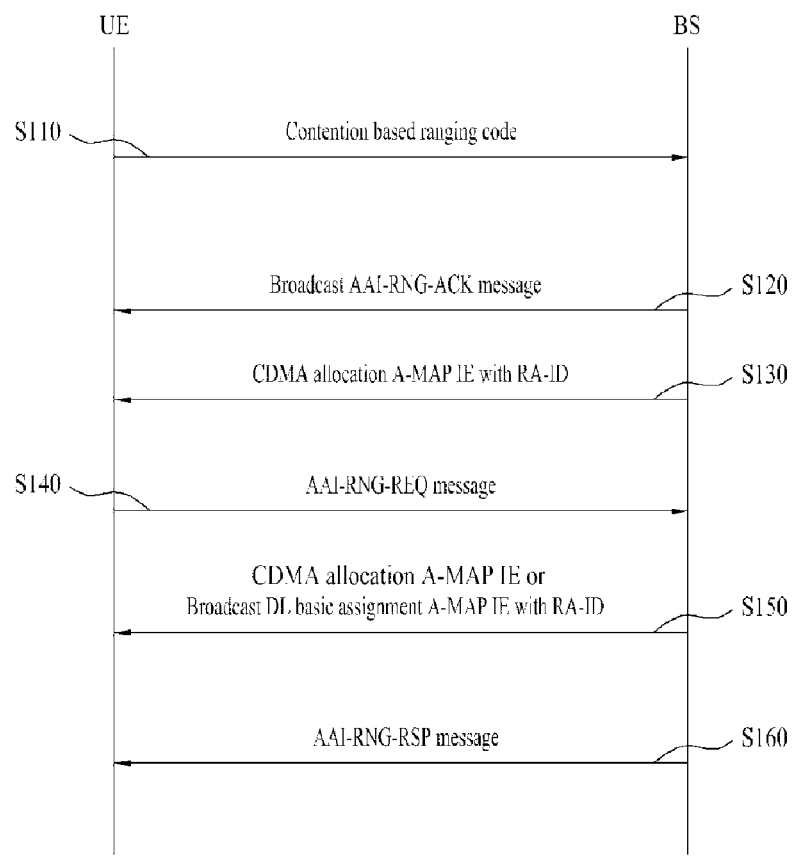
FIG. 4 is a diagram illustrating a signal flow for performing contention-based network reentry at a UE in the IEEE 802.16m system.

FIG. 4 is a diagram illustrating a signal flow for performing contention-based network reentry at a UE in the IEEE 802.16m system.

Referring to FIG. 4, a UE selects an RCH and a contention-based ranging code and transmits the contention-based ranging code on the selected RCH (S110). Upon successful receipt of the ranging code, a BS broadcasts an AAI Ranging ACKnowledgment (AAI-RNG-ACK) message to the UE (S120). The AAI-RNG-ACK message is a response message indicating that ranging codes have been successfully received on RCHs. The BS masks a Code Division Multiple Access (CDMA) allocation A-MAP IE being UL resource allocation information for transmission of an AAI-RNG-REQ message from the UE by a Random Access Identifier (RA-ID) and transmits the masked CDMA allocation A-MAP IE to the UE (S130). The UE transmits an AAI-RNG-REQ message to the BS in allocated UL resources (S140), and the BS transmits DL resource allocation information for transmission of an AAI-RNG-RSP message to the UE (S150). Herein, the DL resource allocation information may be transmitted to the UE in a CDMA allocation A-MAP IE or Broadcast DL basic assignment A-MAP IE masked by the RA-ID. Then the UE may receive an AAI-RNG-RSP message in allocated DL resources (S160).

Figure 5:
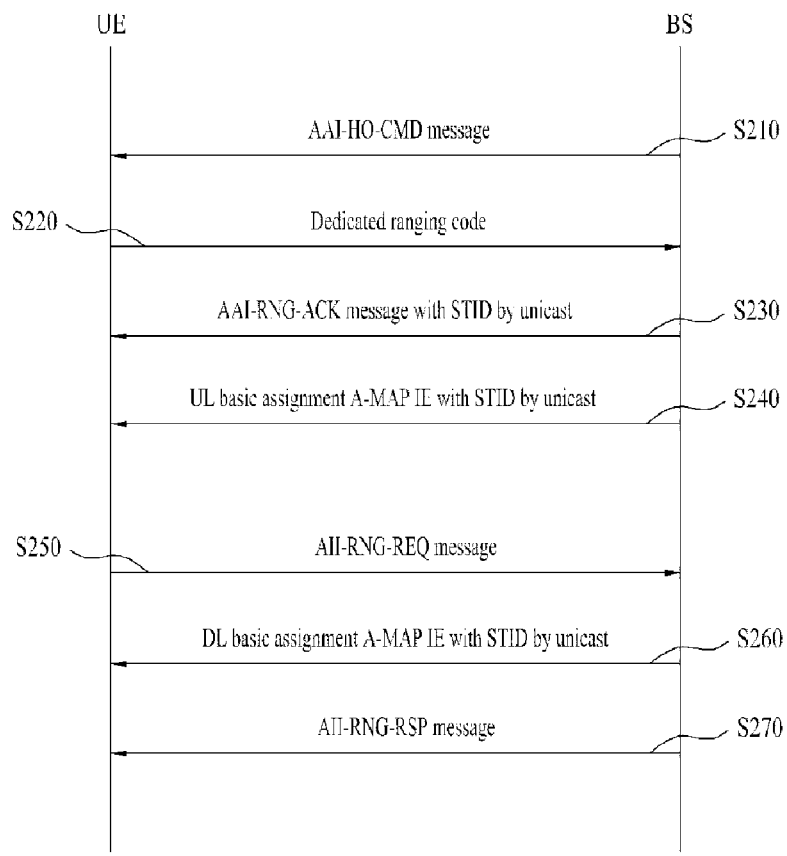
FIG. 5 is a diagram illustrating a signal flow for performing non-contention-based network reentry at a UE in the IEEE 802.16m system.

FIG. 5 is a diagram illustrating a signal flow for performing non-contention-based network reentry at a UE in the IEEE 802.16m system. Non-contention-based handover ranging is taken as an example.

Referring to FIG. 5, a serving BS transmits a dedicated ranging code in an AAI Handover Command (AAI-HO-CMD) message to a UE (S210). The UE transmits the allocated dedicated ranging code to a target BS (S220). The target BS notifies the UE of successful reception of the dedicated ranging code by unicasting a Station Identifier (STID)-based AAI Ranging ACKnowledgment (AAI-RNG-ACK) message (S230). Upon receipt of the dedicated ranging code, the target BS identifies the UE that has transmitted the dedicated ranging code. The AAI-HO-CMD message includes an STID allocated to the UE in advance by the target BS as well as the dedicated ranging code. In this case, because the UE has already acquired the STID, the AAI-RNG-ACK message may not be transmitted in an RA-ID-based manner. The target BS transmits UL resource allocation information for transmission of an AAI-RNG-REQ message from the UE by unicasting an STID-based UL basic assignment A-MAP IE (S240). The UE transmits an AAI-RNG-REQ message to the target BS in allocated UL resources (S250), and the BS transmits DL resource allocation information for transmission of an AAI-RNG-RSP message to the UE by an STID-based DL basic assignment A-MAP IE (S260). Then, the UE may receive the AAI-RNG-RSP message in allocated DL resources (S270).

As described before, a BS transmits a dedicated ranging code and an STID preliminarily allocated to a UE in an AAI-HO-CDM message during non-contention-based ranging for network reentry. However, an M2M device performs a ranging procedure based on an RA-ID during non-contention-based ranging for network reentry, discrimination from other existing RA-ID-based ranging procedures becomes an issue.

First of all, an RA-ID will be described briefly. The RA-ID is 15 bits in total, defined according to the random access characteristic of a UE. Specifically, the RA-ID includes a 5-bit SFN, a 2-bit frame index, a 6-bit preamble code index for ranging, and a 2-bit opportunity index for ranging. The 6-bit preamble code index indicates a ranging code, and the 2-bit opportunity index indicates an RCH carrying the ranging code. Specifically, the opportunity index is set to '0b00' indicating NS-RCH, to '0b11' indicating S-RCH, and to '0b01/0b10' indicating dynamic RCH. That is, the 6-bit ranging code and the 2-bit information indicating an RCH carrying the ranging code are main elements of the RA-ID.

Figure 6:
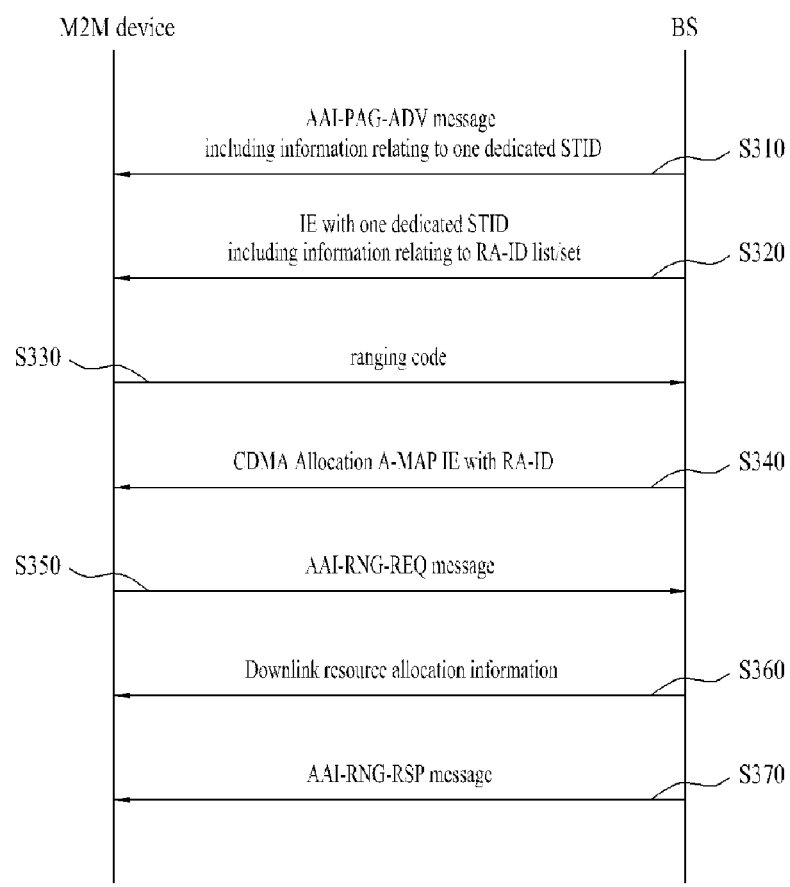
FIG. 6 is a diagram illustrating a signal flow for performing non-contention-based network reentry at a Machine to Machine (M2M) device according to an embodiment of the present invention.

FIG. 6 is a diagram illustrating a signal flow for performing non-contention-based network reentry at an M2M device according to an embodiment of the present invention.

Referring to FIG. 6, a BS may set one dedicated ID (e.g. one dedicated STID). The STID may be used for an M2M device or M2M devices during non-contention-based network reentry. The BS broadcasts an AAI-PAG-ADV message including the dedicated STID (S310).

The BS transmits information about an RA-ID list/set in a specific IE masked by the dedicated STID to the M2M device or M2M devices (S320). The RA-ID list/set information may include information about dedicated ranging codes and RCHs. The specific IE may be a UL basic allocation A-MAP IE or a broadcast A-MAP IE. Alternatively, the RA-ID list/set information may be transmitted in a newly defined IE. A method for masking a CRC by a dedicated STID will be described below in detail with reference to Table 1, Table 2, and Table 3.

An M2M device selects an RCH and a ranging code and transmits the ranging code on the selected RCH to the BS (S330). The BS masks the CRC of a CDMA allocation A-MAP IE being UL resource allocation information for transmission of an AAI-RNG-REQ message from the M2M device by an RA-ID and transmits the CRC-masked CDMA allocation A-MAP IE to the M2M device (S340). The M2M device transmits an AAI-RNG-REQ message to the BS in allocated UL resources (S350), and the BS transmits DL resource allocation information for transmission of an AAI-RNG-RSP message to the M2M device (S360). Then, the M2M device may receive the AAI-RNG-RSP message from the BS in allocated DL resources (S370).

If corresponding M2M devices form a specific paging group, one dedicated STID may be transmitted in a field related to a paging group ID in the AAI-PAG-ADV message.

If the M2M devices are included in a single M2M group, an M2M Group Identifier (MGID) may be used instead of one dedicated STID.

Table 1, Table 2 and Table 3 illustrate CRC masks in the IEEE 802.16m system. A CRC is composed of a 1-bit masking prefix, a 3-bit type indicator, and the other 12 bits.

TABLE 1

| Masking Prefix | Remaining 15 bit LSBs | |
|---|---|---|
| (1 bit MSB) | Type Indicator | Masking Code |
| 0b0 | 0b000 | 12 bit STID or TSTID |
| | 0b001 | Refer to Table 844 |
| | 0b010 | Refer to Table 845 |
| 0b1 | 15 bit RA-ID: The RA-ID is derived from the AMS random access attributes (i.e.. superframe number (LSB 5 bits). frame_index (2 bits). preamble code index for ranging or BR (6 bits) and opportunity index for ranging or BR (2 bits) as defined below: RA-ID = (LSB 5 bits of superframe number frame_index preamble_code_index opportunity_index) | |

Referring to Table 1, Masking Prefix is 1 bit set to '0b0' or '0b1'. If Masking Prefix is '0b0', this implies a masking code according to a type indicator. Only type indicators of '0b000', '0b001', and '0b010' are defined. If the type indicator is '0b000', this indicates a 12-bit STID or TSTID. If the type indicator is '0b001', Table 844 is referred to. If the type indicator is '0b010', Table 845 is referred to. Table 844 and Table 845 correspond to Table 2 and Table 3, respectively.

TABLE 2

Table 844 - Description of the Masking Code for type indicator 001

| Decimal Value | Description |
|---|---|
| 0 | Used to mask Broadcast Assignment A-MAP IE for broadcast or ranging channel assignment |
| 1 | Used to mask BR-ACK A-MAP IE |
| 2-128 | Used to mask Group Resource Allocation A-MAP IE (group ID) |
| Others | Reserved |

TABLE 3

Table 845 - Description of the Masking Code for type indicator 010

| Decimal Value | Description |
|---|---|
| 4095 | Used to mask Broadcast Assignment A-MAP IE for multicast assignment |
| Others | Reserved |

In a CRC masking method using a dedicated STID according to the present invention, a conventionally defined STID is still used, which includes a masking prefix set to '0b0', a type indicator set to '0b000', and a 12-bit masking code. A Broadcast Assignment A-MAP IE for allocating M2M dedicated ranging resources may be CRC-masked by a value with a masking prefix set to '0b0', a type indicator set to '0b001', and a decimal value of '129' or '4095'. Or, a Broadcast Assignment A-MAP IE for allocating M2M dedicated ranging resources may be CRC-masked by a value with a masking prefix set to '0b0', a type indicator set to '0b010', and a decimal value of '0' or '4094'. Meanwhile, a Function Index set to '0b11' may be defined as an index for M2M dedicated ranging resource allocation in the Broadcast Assignment A-MAP IE and this field may include RA-ID list/set information. In addition, when an MGID is used instead of a single dedicated STID, the above-described CRC masking method may also be performed in the same manner.

Figure 7:
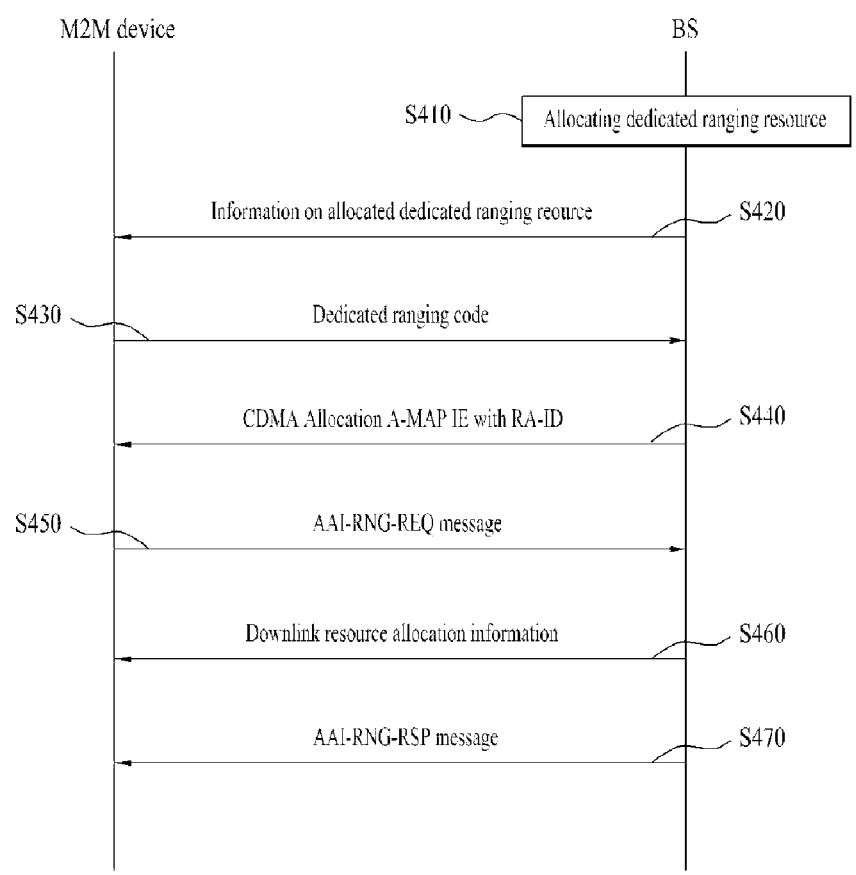
FIG. 7 is a diagram illustrating a signal flow for performing non-contention-based network reentry at an M2M device according to an embodiment of the present invention.

FIG. 7 is a diagram illustrating a signal flow for performing non-contention-based network reentry at an M2M device according to an embodiment of the present invention.

Referring to FIG. 7, a BS may allocate M2M dedicated ranging resources including an M2M dedicated ranging code and an RCH (or a ranging opportunity) (S410). In this case, an M2M device may perform non-contention-based network reentry using the dedicated ranging resources.

The BS transmits information about the allocated M2M dedicated ranging resources to the M2M device (S420). Methods for transmitting the information about the allocated M2M dedicated ranging resources will be described later in detail. If the BS does not allocate M2M dedicated ranging resources, the M2M device may perform a network reentry procedure in ranging resources indicated by an S-SFH SP1 IE. Subsequently, the M2M device performs ranging for network reentry in the allocated dedicated ranging resources. That is, the M2M device transmits the allocated dedicated ranging code on the allocated RCH to the BS (S430). The BS masks a CDMA Allocation A-MAP IE being UL resource allocation information for transmission of an AAI-RNG-REQ message from the M2M device by an RA-ID and transmits the masked CDMA Allocation A-MAP IE to the M2M device (S440).

The opportunity index of the RA-ID by which the CDMA Allocation A-MAP IE is masked may be set to one of '0b01' and '0b10', to serve a different purpose and usage different from a conventional purpose and usage. The set opportunity index may be used as a type indicator indicating an M2M dedicated ranging code or RCH. In this case, the opportunity index indicating a dynamic RCH (e.g. a dynamic NS-RCH) should be set to any other value. For instance, if an opportunity index is set to '0b01' to indicate an M2M dedicated ranging code or RCH, the opportunity index should be set to '0b10' to indicate a dynamic RCH.

The M2M device may transmit an AAI-RNG-REQ message to the BS in allocated UL resources (S450). The M2M device may receive DL resource allocation information for DL transmission of an AAI-RNG-RSP message from the BS (S460) and receive the AAI-RNG-RSP message in allocated DL resources (S470).

A description will be given of how to indicate allocated M2M dedicated ranging resources to an M2M device or M2M devices. If information about allocated dedicated ranging resources is transmitted in an AAI-HO-CMD message as is done to an H2H terminal, the allocation information should be unicast to a plurality of individual M2M devices, thereby increasing overhead. In this context, a method for broadcasting information about allocated dedicated ranging resources in an S-SFH, an AAI-SCD message, or a Broadcast Assignment A-MAP IE is proposed. When the S-SFH is used, there is no space available in the S-SFH SP1 IE and S-SFH SP2 IE due to existing information in them. Although the S-SFH SP3 IE has space to additionally transmit the information about allocated dedicated ranging resources, collision between M2M devices and H2H terminals should be considered because the S-SFH SP3 IE carries system configuration information for all UEs. Accordingly, a careful approach is required to transmit the information about allocated dedicated ranging resources on the S-SFH.

One of methods for transmitting information about allocated M2M dedicated ranging resources is to use an AAI- SCD message. Preferably, the information about allocated M2M dedicated ranging resources is transmitted in the AAI-SCD message, and related control information is transmitted on the S-SFH.

A dedicated ranging region and a dedicated ranging code index/set may be additionally defined in the AAI-SCD message. The dedicated ranging region indicates an M2M dedicated RCH and the dedicated ranging code index indicates an M2M dedicated ranging code.

If one subband is already used as the dedicated ranging region for M2M in the frequency domain, one more subband may be allocated. The position of the additional subband may be indicated by the resource index of the subband following a cell-specific ranging subband or the resource index of a subband spaced by a specific offset. The offset is preset or indicated by the S-SFH.

In addition, the index of a subframe of the M2M dedicated RCH may be indicated from the temporal and spatial perspectives. In this case, if up to one subframe per frame and even dynamic ranging are considered, allocation of an additional subframe in an environment supporting up to two subframes per frame is not viable in a frame structure having two UL subframes. Thus dedicated ranging resource allocation may be prohibited in the frame structure having two UL subframes. For example, the validity of a subframe index may be determined by an operation for indicating dedicated ranging allocation.

The dedicated ranging code index/set is 5 bits, for representing up to 32 M2M dedicated ranging codes. In addition, the dedicated ranging code index/set may be configured separately for each M2M device by adding an MGID to this field.

Figure 9:
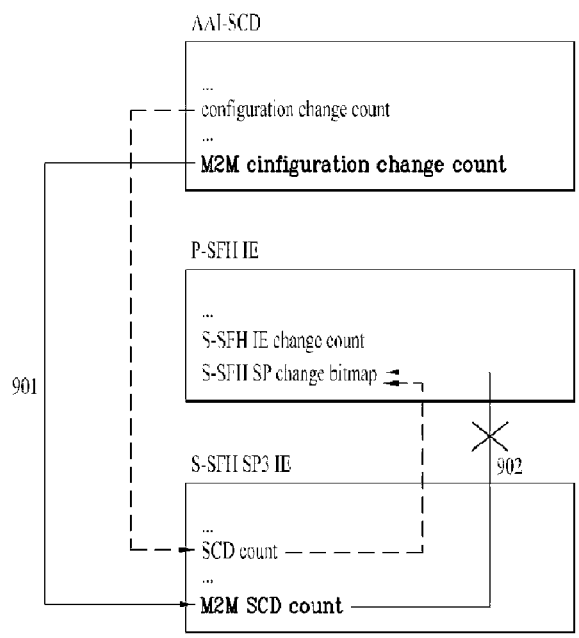
FIG. 9 illustrates a relationship among an AAI-SCD message, a P-SFH IE, and an S-SFH IE according to an embodiment of the present invention.

Meanwhile, if dedicated ranging resource allocation information is updated by transmitting a dedicated ranging change count field for the dedicated ranging resource allocation information in both the S-SFH and the AAI-SCD message, unnecessary information decoding oft H2H terminals and non-associated M2M devices may be prevented, as described later with reference to FIG. 9.

Another method for transmitting M2M dedicated ranging resource allocation information is to use a Broadcast Assignment A-MAP IE. The Broadcast Assignment A-MAP IE includes Number of Ranging Opportunities, Subframe index, and Ranging opportunity index. Information about a dedicated RCH and a dedicated ranging code may be provided using these fields.

Meanwhile, the Broadcast Assignment A-MAP IE includes the Function Index field. The Function Index field indicates what information is carried in the Broadcast assignment A-MAP IE. Specifically, if the Function Index is '0b00', this implies that the Broadcast Assignment A-MAP IE delivers broadcast assignment information. If the Function Index field is '0b01', this implies that the Broadcast Assignment A-MAP IE delivers handover ranging channel allocation information. If the Function Index field is '0b10', this implies that the Broadcast Assignment A-MAP IE delivers multicast assignment information. '0b11' is reserved. Herein, if the Function Index is '0b01', a dynamic RCH for handover is indicated by two ranging opportunity indexes. Therefore, one of the ranging opportunity indexes may be used to indicate M2M dedicated ranging resource allocation.

Alternatively, the reserved value of the Function Index, '0b11' may be defined to indicate M2M dedicated ranging resource allocation. Thus, when the Function Index is set to '0b11', M2M dedicated ranging resource allocation information may be transmitted in the field (e.g., a subframe index, an RCH index, and a ranging code index).

A third method for transmitting M2M dedicated ranging resource allocation information is to define an M2M dedicated Broadcast Assignment A-MAP IE that only M2M devices can receive and decode. For this purpose, the M2M dedicated Broadcast Assignment A-MAP IE may be CRC-masked by an MGID or an M2M dedicated STID and transmitted so as to prevent H2H terminals and non-related M2M devices from decoding the M2M dedicated Broadcast Assignment A-MAP IE.

However, decoding the M2M dedicated Broadcast A-MAP IE all the time may impose a constraint on M2M devices requiring low-power consumption. Therefore, only when the M2M dedicated ranging indicator field indicates M2M dedicated ranging in the S-SFH SP3 IE, the M2M devices may decode the M2M dedicated Broadcast Assignment A-MAP IE. In this case, the M2M dedicated Broadcast Assignment A-MAP IE is transmitted at a predetermined position (e.g. a predetermined frame and subframe) or in the S-SFH SP3 IE.

Hereinbelow, a description will be given of methods for, when an AAI-SCD message includes M2M dedicated ranging resource allocation information, preventing existing HTC terminals from decoding the information unnecessarily.

Figure 8:
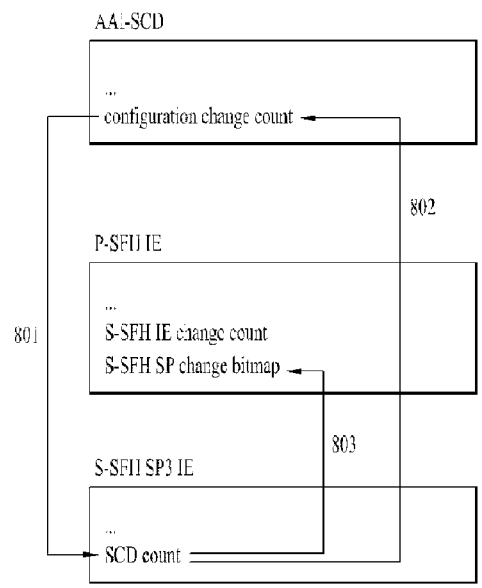
FIG. 8 illustrates a relationship among an Advanced Air Interface-System Configuration Descriptor (AAI-SCD) message, a Primary SFH (P-SFH) IE, and an S-SFH IE.

Before describing the methods, a relationship among an AAI-SCD message, a P-SFH IE, and an S-SFH IE will be described with reference to FIG. 8. In FIG. 8, the AAI-SCD message, the P-SFH IE, and the S-SFH SP3 IE are illustrated and fields that are not related to the following description of each format are not provided herein. The configuration change count field of the AAI-SCD message indicates whether the AAI-SCD message has been changed.

If system information carried in the AAI-SCD message has been changed, the configuration change count field of the AAI-SCD message is incremented and thus the SCD count field of the S-SFH SP3 IE indicating the configuration change count field is also changed (incremented) (801). To indicate that the S-SFH SP3 IE has been changed, an S-SFH IE change count field and an S-SFH SP change bitmap field are set in the P-SFH IE (803). Therefore, after decoding the P-SFH IE and then decoding an S-SFH SP3 IE indicated by the S-SFH SP change bitmap field, the UE may be aware from the SCD count field that system information has been changed in the AAI-SCD message. Subsequently, the UE may receive a new AAI-SCD message including the changed system information and apply the changed system information.

Meanwhile, if information included in the S-SFH SP3 IE has been changed, the SCD count field of the S-SFH SP3 IE is changed. To indicate the change of the S-SFH SP3 IE, the S-SFH IE change count field and the S-SFH SP change bitmap field are set in the P-SFH IE (802). The change of the SCD count field leads to the change of the configuration change count field of the AAI-SCD message (803). This AAI-SCD message is transmitted to the UE before the changed S-SFH SP3 IE is transmitted. The UE may acquire changed information in the S-SFH SP3 IE by decoding the P-SFH IE.

In the case where the AAI-SCD message includes M2M dedicated ranging information, when the M2M dedicated ranging information is changed, the configuration change count field of the AAI-SCD message and then the SCD count field of the S-SFH SP3 IE are changed, as described above. In addition, the S-SFH IE change count field and S-SFH SP change bitmap fields of the P-SFH IE are changed. In this case, all UEs that have received the AAI-SCD message necessarily decode an S-SFH SP3 IE indicated by the decoded P-SFH IE in a superframe. As a consequence, existing HTC terminals that do not need the M2M dedicated ranging information unnecessarily decode the information. Accordingly, the present invention provides methods for allowing only M2M devices requiring M2M dedicated ranging information to decode the M2M dedicated ranging information.

One of the methods for allowing only M2M devices requiring M2M dedicated ranging information to decode the M2M dedicated ranging information is to transmit a field indicating a change in the M2M dedicated ranging information in both the AAI-SCD message and the S-SFH SP3 IE. Referring to FIG. 9, the AAI-SCD message may include second count information (i.e. an M2M configuration change count field) indicating a change in the M2M dedicated ranging information, and the S-SFH SP3 IE may include first count information for M2M (i.e. an M2M SCD count field) interacting with the M2M configuration change count field (i.e. indicating the M2M configuration change count field). If the M2M dedicated ranging information is changed in the AAI-SCD message, the M2M configuration change count field of the AAI-SCD message is changed and thus the M2M SCD count field of the S-SFH SP3 IE is also changed (901).

Unlike the SCD count field, the change of the M2M SCD count field may not cause a change in information included in the P-SFH IE (the S-SFH change count field and the S-SFH SP change bitmap field) (902). In other words, even though the M2M dedicated ranging information is changed in the AAI-SCD message, the information of the P-SFH IE is not reconfigured. Since the S-SFH IE change count field and S-SFH change bitmap field do not indicate a change of an S-SFH SP3 IE in the P-SFH IE, existing HTC terminals not related to the M2M dedicated ranging information may not decode the S-SFH SP3 IE. However, M2M devices may not know the change of the M2M SCD count field of the S-SFH SP3 IE simply by decoding the P-SFH IE. Therefore, the M2M devices may be configured so as to decode the S-SFH SP3 IE all the time.

Even though the M2M dedicated ranging information is additionally changed, the configuration change count field of the AAI-SCD message may not be changed. If the configuration change count field of the AAI-SCD message is changed in this case, even though the change of the M2M SCD count field does not cause a change in the information of the P-SFH (the S-SFH change count field and the S-SFH SP change bitmap field), the configuration change count field is incremented due to the changed M2M dedicated ranging information of the AAI-SCD message. Successively, the SCD count field of the S-SFH SP3 IE is changed. To indicate the change of the SCD count field, information of the P-SFH IE is changed. HTC terminals always decode the P-SFH. Since the information of the P-SFH IE indicates the change of the S-SFH SP3, the HTC terminals decode unnecessary M2M dedicated ranging information.

According to the above description, operations of an HTC terminal and an M2M device will be summarized as follows.

For the HTC terminal, i) dedicated ranging information may be changed or ii) any other information may be changed. In the case of i), the HTC terminal receives a superframe, decodes a P-SFH IE, and determines that the S-SFH IE change count field and S-SFH change bitmap field of the P-SFH IE have not been changed (because the changed dedicated ranging information does not affect information included in the P-SFH IE). Therefore, the HTC terminal does not decode an S-SFH IE.

In the case of ii), the HTC terminal receives a superframe, decodes a P-SFH IE, and determines an S-SFH IE to be decoded from the S-SFH IE change count field and S-SFH change bitmap field of the P-SFH IE (for example, if the S-SFH change bitmap field=100, the HTC terminal decodes the S-SFH SP3 IE). Subsequently, the HTC terminal acquires changed information by decoding the S-SFH IE.

Similarly for the M2M device, iii) dedicated ranging information may be changed or iv) any other information may be changed. In the case of iii), the M2M device receives a superframe, decodes a P-SFH IE, and determines that no S-SFH IEs have been changed (because the changed dedicated ranging information dos not affect information included in the P-SFH IE). However, the M2M device is supposed to always decode the S-SFH SP3 IE as described before and thus decodes the S-SFH SP3 IE. The M2M device may determine that the M2M SCD count field of the S-SFH SP3 IE has been changed and thus acquire dedicated ranging information from a later-received AAI-SCD message.

In the case of iv), the M2M device operates in the same manner as the HTC terminal in the case of ii) except that the M2M device decodes the S-SFH SP3 IE even though the S-SFH IE change count field and S-SFH change bitmap field of the P-SFH IE indicates that an S-SFH IE other than the S-SFH SP3 IE has been changed.

Meanwhile, an information field indicating a time and/or periodicity for indicating dedicated ranging information may be included in the S-SFH SP3 IE so that an M2M device may decode the S-SFH SP3 IE according to the periodicity.

Secondly, the M2M SCD count field may be transmitted in a paging message (e.g. an AAI-PAG-ADV message) and the M2M configuration change count field may be transmitted in an AAI-SCD message. In this case, an M2M device or M2M group that performs network entry/network reentry using the paging message may be aware from the M2M SCD count field and the M2M configuration change count field that dedicated ranging information carried in the AAI-SCD message has been updated and even a time of applying the updated dedicated ranging information.

The M2M device may store a previous count and determine when the updated information will be transmitted by comparing the stored count with a new received count. Information about the applying time may be acquired in the same manner as in a conventional AAI-SCD update procedure.

Thirdly, a new message may be defined to transmit the M2M SCD count field. Advantageously, even the initial network entry of an M2M device may be supported. Because a UE may not know a transmission time and transmission periodicity of the new message, the new message needs to be transmitted at a specific time with a specific periodicity. Therefore, the transmission time of the new message may be set to a superframe corresponding to an S-SFH change cycle known to all UEs. For example, a message carrying the M2M SCD count field may be transmitted in the first superframe of the S-SFH change cycle, and the S-SFH change cycle may be set as the transmission cycle of the new message. The subsequent operation is performed in the same manner as in the first method.

The foregoing methods may be applied according to a later-described ranging indicator, for example, on the condition that the ranging setting indicator indicates M2M dedicated ranging.

Now a description will be given of an indicator indicating whether an M2M device will perform contention-based network entry or non-contention-based network entry. A large amount of contention-based ranging resources may need to be allocated to H2H terminals according to the environment of the wireless communication system. In this case, a relatively large amount of non-contention-based ranging resources may need to be allocated to M2M devices. On the contrary, there may be a case where a large amount of non-contention-based ranging resources are to be allocated to H2H terminals and a relatively large amount of contention-based ranging resources are to be allocated to M2M devices.

An M2M ranging indicator field may be defined to indicate one of the above cases according to an environment, thereby enabling efficient use of limited resources. Basically, it is assumed that M2M dedicated ranging resource information is transmitted in an AAI-SCD message, which should not be construed as limiting the present invention.

The M2M ranging indicator field may be configured so as to indicate contention-based ranging for M2M devices (i.e., the same normal ranging as for HTC terminals), non-contention-based ranging (i.e. dedicated ranging for M2M devices), network reentry not allowed for M2M devices, and/or both non-contention-based ranging and contention-based ranging available to M2M devices. To indicate the contents, the M2M ranging indicator field may be 1 bit or 2 bits.

When the M2M ranging indicator field is 1 bit, it may be set to '0b0' to indicate non-contention-based ranging and to '0b1' to indicate only contention-based ranging. The value of the M2M ranging indicator field, '0b0' may mean that non-contention-based ranging is allowed, in other words, both non-contention-based ranging and contention-based ranging are available. It may be further contemplated that an M2M shared ranging allowance indicator is additionally defined to indicate that only non-contention-based ranging is allowed. Then the M2M shared ranging allowance indicator may be set to '0b0' to indicate that contention-based ranging is allowed and to '0b1' to indicate that only non-contention-based ranging is allowed.

On the other hand, the M2M ranging indicator field may be configured such that '0b0' indicates contention-based ranging and '0b1' indicates only non-contention-based ranging. The value '0b0' means that contention-based ranging is allowed, that is, both contention-based ranging and non-contention-based ranging are available. An M2M dedicated ranging allowance indicator may be additionally defined such that '0b0' indicates that non-contention-based ranging is allowed and to '0b1' indicates that only contention-based ranging is allowed.

The M2M ranging indicator field may be 2 bits in the following cases. If it is '0b00', the M2M ranging indicator field may indicate normal ranging without allowing dedicated ranging for M2M devices. If it is '0b01', the M2M ranging indicator field may indicate dedicated ranging for M2M devices, and if it is '0b10', the M2M ranging indicator field may indicate that both contention-based ranging and non-contention-based ranging are available to M2M devices. If it is '0b11', the M2M ranging indicator field may indicate that network entry/reentry is not allowed for M2M devices. Mapping between values and their meanings may be changed and all or a part of the four values may be used.

As described above, the M2M ranging indicator field may be included in a message/format defined in the IEEE 802.16m system. That is, the M2M ranging indicator field may be included in an AAI-SCD message, an S-SFH SP IE, or a Broadcast Assignment A-MAP IE.

In the case where the M2M ranging indicator field is included in an AAI-SCD message, it may be understood that inclusion of the M2M ranging indicator field in an S-SFH IE is a load. As described before, the M2M ranging indicator field of the AAI-SCD message may be 1 or 2 bits. Unlike the above description of a 2-bit M2M ranging indicator field, the M2M ranging indicator field may be configured so as to indicate normal ranging without allowing dedicated ranging for M2M devices, if it is '0b00', dedicated ranging for M2M devices, if it is '0b01', and network entry/reentry not allowed for M2M devices, if it is '0b10'.

Or, the 5-bit dedicated ranging code index/set included in the AAI-SCD message may be defined to additionally indicate whether only contention-based ranging or only non-contention-based ranging is allowed.

In the case where the M2M ranging indicator field is included in an S-SFH SP IE, the M2M ranging indicator field may also be 1 or 2 bits, which will not be described in detail herein to avoid redundancy.

In the case where the M2M ranging indicator field is included in a Broadcast Assignment A-MAP IE for M2M devices of a specific M2M group, the M2M ranging indicator field may also be 1 or 2 bits. An ID identifying the M2M group (e.g. an MGID) may be added. Or, ranging may be set for a specific M2M device or M2M group by including the M2M ranging indicator field in a paging message for the specific M2M device or M2M group that performs network reentry in idle mode.

The M2M ranging indicator field may be used in an IEEE 802.16e system. In this case, a method for preventing the use of the M2M ranging indicator field from affecting legacy UEs is needed. To be more specific, UL-MAP IEs each having a fixed length for a plurality of UEs are transmitted in one message (e.g. a UL-MAP message) and the UL-MAP message is added with padding bits to match to a given number of bits in the IEEE 802.16e system. If an M2M ranging indicator field is included in a UL-MAP IE for each individual UE, the length of the UL-MAP message is changed, thereby affecting decoding at the legacy UEs. To solve the problem, the following methods may be used.

The M2M ranging indicator field may be disposed at the padding bit area of the UL-MAP message. Thus, the padding bit area of the conventional UL-MAP message may be reduced by the number of bits of the inserted M2M ranging indicator field. Therefore, legacy UEs may decode the UL-MAP message in a conventional manner, whereas M2M devices may decode the UL-MAP message, up to the M2M ranging indicator field.

Or a new MAP IE may be defined for M2M devices and the M2M ranging indicator field may be included in the new MAP IE. To avoid effects on legacy UEs, the length of the new MAP IE may be set to be equal to that of the conventional UL-MAP IE or the new MAP IE may be transmitted at the end of the UL-MAP message.

Or, the M2M ranging indicator field may be transmitted on a higher-layer control signal transmission channel, not in a UL-MAP IE. Specifically, reserved bits of a UL Channel Descriptor (UCD) or Frame control Header (FCH) may be used.

Figure 10:
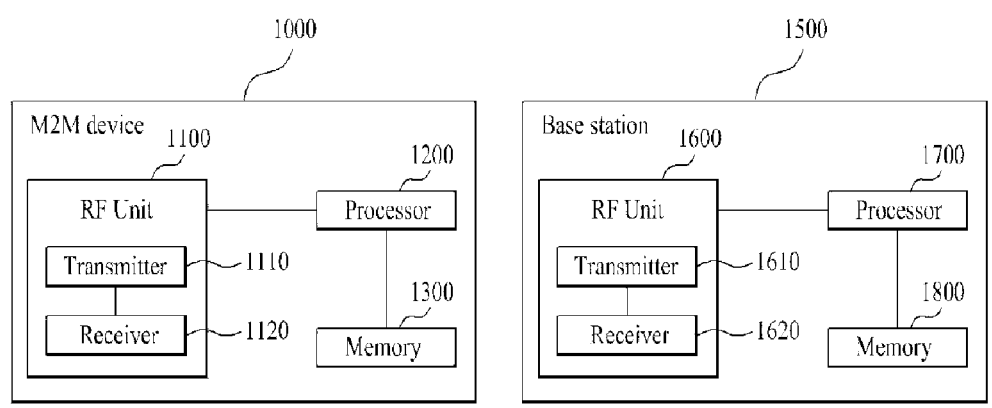
FIG. 10 is a block diagram of an M2M device and a Base Station (BS) according to an embodiment of the present invention.

FIG. 10 is a block diagram of an M2M device and a BS according to an embodiment of the present invention.

Referring to FIG. 10, an M2M device 1000 and a BS 1500 may include Radio Frequency (RF) units 1100 and 1600, processors 1200 and 1700, and memories 1300 and 1800, respectively. Each RF unit 1100 or 1600 may include a transmitter 1110 or 1610 and a receiver 1120 or 1620.

The transmitter 1110 and the receiver 1120 of the M2M device 1000 are configured so as to transmit signals to and receive signals from the BS 1500 and another M2M device. The processor 1200 is functionally connected to the transmitter 1110 and the receiver 1120 to control signal transmission and reception to and from other terminals through the transmitter 1110 and the receiver 1120.

The processor 1200 processes a transmission signal and then transmits the processed signal to the transmitter 1110. The processor 1200 also processes a signal received from the receiver 1120. When needed, the processor 1200 may store information included in exchanged messages in the memory 1300. The M2M device 1000 having the above-described configuration may implement the methods according to the foregoing embodiments of the present invention.

While not shown in FIG. 10, the M2M device 1000 may include many additional components according to its application type. If the M2M device 1000 is designed for smart metering, it may further include a component for power measuring. The power measuring operation may be under the control of the processor 1200 or a separately procured processor (not shown).

While communication is conducted between the M2M device 1000 and the BS 1500 in the illustrated case of FIG. 10, M2M communication may also be performed between M2M devices according to the present invention. Each terminal having the same configuration illustrated in FIG. 10 may perform the methods according to the foregoing embodiments of the present invention.

Meanwhile, the transmitter 1610 and the receiver 1620 of the BS 1500 are configured to transmit signals to and receive signals from another BS, an M2M server, and M2M devices. The processor 1700 is functionally connected to the transmitter 1610 and the receiver 1620 to thereby control signal transmission and reception to and from other terminals through the transmitter 1610 and the receiver 1620.

The processor 1700 processes a transmission signal and then transmits the processed signal to the transmitter 1610. The processor 1700 also processes a signal received from the receiver 1620. When needed, the processor 1700 may store information included in an exchanged message in the memory 1800. The BS 1500 having the configuration may perform the methods according to the foregoing embodiments of the present invention.

The processors 1200 and 1700 of the M2M device 1100 and the BS 1500 command (e.g. control, adjust, and manage) operations of the M2M device 1100 and the BS 1500, respectively. The processors 1200 and 1700 may be connected respectively to the memories 1300 and 1800 that store program codes and data.

The memories 1300 and 1800 are connected to the processors 1200 and 1700 and store an Operating System (OS), applications, and general files.

The processors 1200 and 1700 may also be called controllers, microcontrollers, microprocessors, or microcomputers. Meanwhile, the processors 1200 and 1700 may be implemented by various means, for example, hardware, firmware, software, or a combination thereof. In a hardware configuration, the processors 1200 and 1700 may include one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), etc. which are configured to implement the present invention.

In a firmware or software configuration, the embodiments of the present invention may be implemented in the form of a module, a procedure, a function, etc. Firmware or software configured to implement the present invention may be included in the processors 1200 and 1700, or may be stored in the memories 1300 and 1800 and executed by the processors 1200 and 1700.

Mode For The Invention

Various embodiments have been described in the best mode for carrying out the invention.

INDUSTRIAL APPLICABILITY

The ranging methods of an M2M device are applicable to various wireless communication systems including 3rd Generation Partnership Project (3GPP) Long Term Evolution-Advanced (LTE-A) and IEEE 802.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for performing ranging at a Machine to Machine (M2M) device in a wireless communication system, the method comprising:
   receiving a Primary SuperFrame Header (P-SFH) and a Secondary SuperFrame Header (S-SFH);
   receiving an Advanced Air Interface-System Configuration Descriptor (AAI-SCD) message; and
   performing dedicated ranging using M2M dedicated ranging information included in the AAI-SCD message,
   wherein first count information included in the S-SFH is increased whenever the M2M dedicated ranging information are changed,
   wherein information indicating a change in the S-SFH, included in the P-SFH, are not changed by an update of the first count information that is due to the change of the M2M dedicated ranging information, and
   wherein the S-SFH including the first count information is an S-SFH SubPacket 3 Information Element (S-SFH SP3 IE).

2. The method according to claim 1, wherein the AAI-SCD message includes second count information that increases whenever the M2M dedicated ranging information is changed, and the first count information indicates the second count information.

3. The method according to claim 1, wherein the M2M device always decodes the S-SFH SP3 IE even though the P-SFH does not indicate the S-SFH SP3 IE.

4. The method according to claim 1, wherein the information indicating the change in the S-SFH, included in the P-SFH, comprise an S-SFH change count and an S-SFH SP change bitmap.

5. The method according to claim 1, wherein the M2M dedicated ranging information includes information about M2M dedicated ranging resources.

6. The method according to claim 1, wherein a configuration change count included in the AAI-SCD message is not increased even though the M2M dedicated ranging information is changed.

7. A method for transmitting ranging information at a Base Station (BS) in a wireless communication system, the method comprising:
transmitting a Primary SuperFrame Header (P-SFH) and a Secondary SuperFrame Header (S-SFH); and
transmitting an Advanced Air Interface-System Configuration Descriptor (AAI-SCD) message,
wherein first count information included in the S-SFH is increased whenever a M2M dedicated ranging information are changed,
wherein information indicating a change in the S-SFH, included in the P-SFH, are not changed by an update of the first count information that is due to the change of the M2M dedicated ranging information, and
wherein the S-SFH including the first count information is an S-SFH SubPacket 3 Information Element (S-SFH SP3 IE).

8. The method according to claim 7, wherein the AAI-SCD message includes second count information that increases whenever the M2M dedicated ranging information is changed, and the first count information indicates the second count information.

9. The method according to claim 7, the M2M device always decodes the S-SFH SP3 IE even though the P-SFH does not indicate the S-SFH SP3 IE.

10. The method according to claim 7, wherein the information indicating the change in the S-SFH, included in the P-SFH, comprise an S-SFH change count and an S-SFH SP change bitmap.

11. The method according to claim 7, wherein the M2M dedicated ranging information includes information about M2M dedicated ranging resources.

12. The method according to claim 7, wherein a configuration change count included in the AAI-SCD message is not increased even though the M2M dedicated ranging information is changed.

13. A Machine to Machine (M2M) device for performing ranging in a wireless communication system, comprising:
a Radio Frequency (RF) unit; and
a processor,
wherein the processor receives a Primary SuperFrame Header (P-SFH), a Secondary SuperFrame Header (S-SFH), and an Advanced Air Interface-System Configuration Descriptor (AAI-SCD) message through the RF unit and controls dedicated ranging to be performed using M2M dedicated ranging information included in the AAI-SCD message, and
wherein first count information included in the S-SFH is increased whenever the M2M dedicated ranging information are changed,
wherein information indicating a change in the S-SFH, included in the P-SFH, are not changed by an update of the first count information that is due to the change of the M2M dedicated ranging information, and
wherein the S-SFH including the first count information is an S-SFH SubPacket 3 Information Element (S-SFH SP3 IE).

14. A Base Station (BS) for transmitting ranging information in a wireless communication system, comprising:
a Radio Frequency (RF) unit; and
a processor,
wherein the processor transmits a Primary SuperFrame Header (P-SFH), a Secondary SuperFrame Header (S-SFH), and an Advanced Air Interface-System Configuration Descriptor (AAI-SCD) message through the RF unit, and
wherein first count information included in the S-SFH is increased whenever a M2M dedicated ranging information are changed,
wherein information indicating a change in the S-SFH, included in the P-SFH, are not changed by an update of the first count information that is due to the change of the M2M dedicated ranging information, and
wherein the S-SFH including the first count information is an S-SFH SubPacket 3 Information Element (S-SFH SP3 IE).

* * * * *